United States Patent
Wen et al.

[19]

[11] Patent Number: 5,956,514
[45] Date of Patent: Sep. 21, 1999

[54] APPARATUS AND METHOD FOR MULTIPLE PROCESSOR SOFTWARE DEVELOPMENT

[75] Inventors: Wilson K. Wen, Anaheim; John D. DiCamillo, Costa Mesa, both of Calif.

[73] Assignee: Boeing North American, Inc., Seal Beach, Calif.

[21] Appl. No.: 07/690,176

[22] Filed: Apr. 12, 1991

[51] Int. Cl.[6] .................................................... G06F 9/45
[52] U.S. Cl. ............................................ 395/706; 395/709
[58] Field of Search .................................... 371/16.2, 16.5; 364/132, 134; 395/183.1, 500, 709, 706

[56] References Cited

U.S. PATENT DOCUMENTS

| | | | |
|---|---|---|---|
| 4,502,116 | 2/1985 | Fowler et al. | 714/4 |
| 4,641,238 | 2/1987 | Kneib | 710/110 |
| 4,803,620 | 2/1989 | Inagami et al. | 712/203 |
| 5,036,453 | 7/1991 | Renner et al. | 712/16 |

FOREIGN PATENT DOCUMENTS 0065272  12/1982  European Pat. Off. .

OTHER PUBLICATIONS

Tanenbaum; Structured Computer Organization; 1984; pp. 10–12.

*Primary Examiner*—Zarni Maung
*Assistant Examiner*—Kenneth R. Coulter
*Attorney, Agent, or Firm*—Charles T. Silberberg; Tom Streeter

[57] ABSTRACT

APPARATUS AND METHOD FOR MULTIPLE PROCESSOR SOFTWARE DEVELOPMENT include a host computer 10, a control processor 12, and a bus 16 between them and one or more nodes 14. Each node 14 includes a master processor 22 and one or more slave processors 24, all of the processors 22, 24 sharing a memory 26. Multiple processor application software may be developed using the host computer 10 and control processor 12 by concurrently monitoring every processor 22, 24 of every node 14. Each master processor 22 is monitored directly through a master transmit/receive buffer 20 between it and the bus 16, and each slave processor 24 of each node 14 is monitored indirectly through a slave transmit/receive buffer 38 in the node's shared memory 26, the buffer 38 extending between that slave processor 24 and that node's master processor 22.

4 Claims, 4 Drawing Sheets

Microfiche Appendix Included
(2 Microfiche, 176 Pages)

| OP CODE | PNEUMONICS | ACTION |
| --- | --- | --- |
| 0X80 | MRES | MASTER S/W RESET (MASTER ONLY) |
| 0X81 | JVEC | JUMP CPU VECTOR |
| 0X82 | XMEM | EXAMINE CPU MEM |
| 0X83 | MMEM | MODIFY CPU MEM |
| 0X84 | HALT | HALT CPU |
| 0X85 | EXGO | EXECUTE CPU |
| 0X86 | XREG | EXAMINE CPU REGISTERS |
| 0X87 | MREG | MODIFY CPU REGISTERS |
| 0X88 | SBPT | SET CPU BREAKPOINT |
| 0X89 | CBPT | CLEAR CPU BREAKPOINT |
| 0X8A | LCMP | DOWNLOAD COMPLETE (MASTER ONLY) |

FIG. 3

APPARATUS AND METHOD FOR MULTIPLE PROCESSOR SOFTWARE DEVELOPMENT

This invention was made with Government support under Contract No. F08635-89-C-0083 awarded by the Air Force. The Government has certain rights in this invention.

The computer program listing referred to herein appears as a microfiche appendix, on a total of two microfiche and a total of one hundred seventy-six frames. Copyright 1991, Rockwell International Corporation. A portion of the disclosure of this patent document contains material, namely, said computer program listing, which is subject to copyright protection. The copyright owner has no objection to the facsimile reproduction by any one of the patent disclosure, as it appears in the Patent and Trademark Office patent files and records, but otherwise reserves all copyright rights whatsoever.

BACKGROUND OF THE INVENTION

The present invention relates to application software development and has particular relation to development of application software to be operated on multiple processors.

When developing application software, it is important to be able to monitor the state of each register in the processor and each location in the memory. "Monitor," as used herein, includes starting, stopping, setting breakpoints at specific program locations, single stepping, writing to individual registers and memory locations, and reading from individual registers and memory locations. Each such activity is called herein a "monitoring act." With single-processor software this is relatively straightforward. A host computer is attached to the processor and memory and puts them through their paces as they operate the application software under development. At any time, and under whatever unique states of the processor and memory as the programmer may choose to load into the host computer, the host computer can stop the processor, examine the various registers and memory locations, step through the application program a single step at a time, reexamine the various registers and memory locations, write new information into them, and restart the application program to see if it works any better. If it does, the application program can then be changed to write the new information itself.

Monitoring multiple-processor software is more complex. Each processor—and there may be sixteen processors or more—must be monitored by a separate computer. Emulator software for the development of application software is still largely designed with a single processor in mind. Accordingly, each of the sixteen emulators is separately monitored by a separate keyboard and a separate cathode ray tube. This requires multiple programmers, or a single programmer with his or her attention diverted to multiple interfaces. This limitation of the prior art has been aptly described by the phrase, "Sixteen emulators, sixteen hands."

SUMMARY OF THE INVENTION

It is an objective of the present invention to eliminate the "Sixteen emulators, sixteen hands" problem. This objective is attained by directly monitoring a single processor (the "master processor") and distributing the software for indirectly monitoring the remaining processor or processors (the "slave processors") in a memory which is shared by the master processor and the slave processors.

It is a feature of the present invention that application software may be developed either for a single memory shared by the master processor and the slave processor(s), such shared memory and associated processors being called herein a "node," or application software may be developed for multiple nodes with a single interface with the programmer.

It is an advantage of the present invention that application software to be operated on separate nodes may be developed concurrently on several nodes, or it may be developed consecutively on one node (or a few nodes) at a time, as the programmer finds most convenient.

BRIEF DESCRIPTION OF THE DRAWINGS

FIG. 3 is a list of operation requests op codes.

DETAILED DESCRIPTION OF A PREFERRED EMBODIMENT

Figure 1:
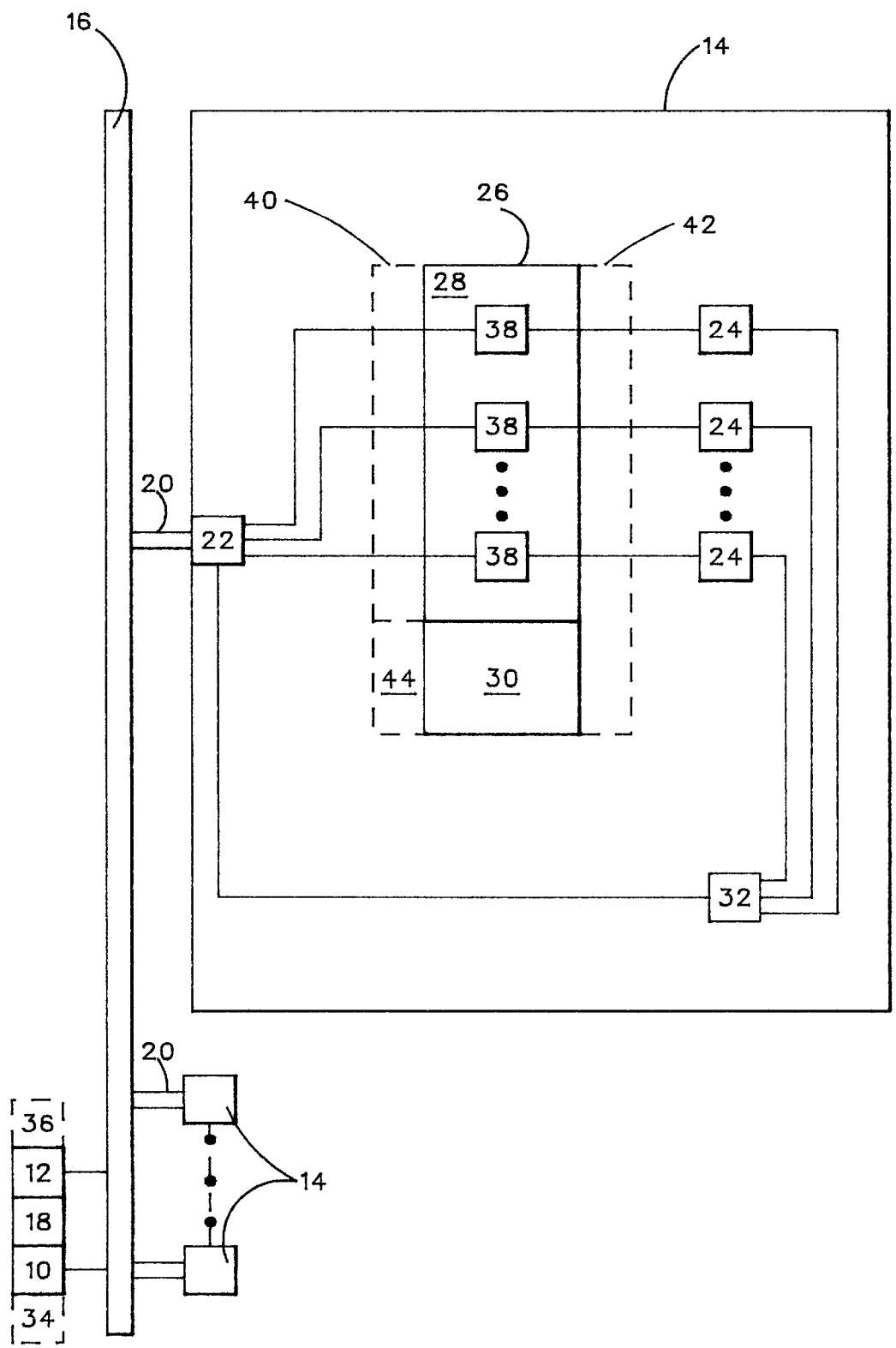
FIG. 1 is a schematic diagram of the hardware of a preferred embodiment of the present invention.

As shown in FIG. 1, the software of the present invention operates on a host computer 10 (preferably a SUN workstation using a SPARC processor), a control processor 12 (preferably a MOTOROLA 68030), and one or more nodes 14, described in greater detail below. The host computer, control processor, and node(s) are joined by a bus 16, preferably a VME bus. The host computer 10 and the control processor 12 are connected by a suitable adapter 18, preferably a BIT3 Inter VME adapter. The control processor 12 and adapter 18 are not absolutely necessary, but greatly enhance the speed at which the host computer 10 may operate the node 14.

Each node 14 includes a master transmit/receive buffer 20, a master processor 22, a plurality of slave processors 24, and a memory 26 (including both a RAM portion 28 and a ROM portion 30) shared by the master processor 22 and the slave processors 24. A control register 32 is preferred but not required. Each node's memory 26 is not shared by the host computer 10, the control processor 12, the control register 32 (if present), or the processors 22,24 of any other node 14. Each slave processor 24 is preferably a TEXAS INSTRUMENTS C30 processor, as is the master processor 22.

During ordinary use, application software for a node 14 may be operated on the node's master processor 22 and slave processors 24 concurrently and indistinguishably. It is not operated on the host computer 10 or the control processor 12, which are used for application software development purposes only. The application software may allow nodes 14 to communicate with one another, but uses other means to do so. These other means may be implemented specifically for the architecture at hand.

Likewise, the application software operating during ordinary use may use any convenient means to communicate between or among processors 22,24 in the same node 14. The preferred means is one or more intra-node transmit/receive buffers in the shared memory. There is no requirement that a separate intra-node transmit/receive buffer be established between each pair (or among any larger plurality) of processors 22,24, but this large number of buffers may be provided if convenient. In particular, the master processor 22 is indistinguishable from the slave processors 24 during ordinary use, so there is no requirement (although it may be convenient) that the master processor 22 have a separate intra-node transmit/receive buffer between it and each slave processor 24.

During application software development, host monitor software 34 (which is resident in the host computer 10), together with control monitor software 36 (which is resident in the control processor 12), monitor each node 14. They monitor the master processor 22 of the node 14 directly through the master transmit/receive buffer 20 for the node 14. The node's master transmit/receive buffer 20 is connected between the VME bus 16 and the master processor 22.

The slave processors 24 are not connected directly to the VME bus 16 by any transmit/receive buffer. Instead, each slave processor 24 and the master processor 22 communicate with each other through a slave transmit/receive buffer 38 in the RAM portion 28 of the shared memory 26. These slave transmit/receive buffers 38 are operated by master monitor software 40 and slave monitor software 42. The master monitor software 40 and slave monitor software 42 are also resident in the shared memory 26. They thereby provide the host computer 10 with distributed (indirect) monitoring of the node's slave processors 24 through the control processor 12 and the node's master processor 22. Additional transmit/receive buffers may be provided between (or among) slave processors 24 if convenient, but there must be a slave transmit/receive buffer 38 between each slave processor 24 and the master processor 22.

The control register 32 is not a part of the shared memory 26, and provides further control over the slave processors 24 in the node 14. The main use of the control register 32 is to generate interrupts from one processor 22,24 to another. While any processor 22,24 can interrupt any other processor or processors directly, a control register 32 facilitates interruption.

Concurrent development of application software on all processors 22,24 on all nodes 14 is enhanced for two reasons. On the hardware side, no separate external monitoring apparatus for each slave processor 24 need be provided. A single host computer 10, adapter 18, control processor 12, and bus 16 will get the job done for all processors 22,24 on all nodes 14. On the software side, no significant portion of the software resident on any processor 22,24 on any node 14 is diverted to the application software development task.

Operation is also enhanced after application software development has been completed. Each node 14 may be operated without distinguishing any master processor 22 from the remaining (slave) processors 24, and with a significantly reduced overhead of both hardware and software. The host computer 10 may be eliminated, as may the control processor 12, the adapter 18 between the host computer 10 and the control processor 12, the bus 16, and the node's master transmit/receive buffer 20. The software 34,36 needed to operate all of the foregoing components may also be eliminated.

A computer program listing printout of a preferred embodiment of the software of the present invention is provided as an unprinted microfiche appendix, and should be referred to for a better understanding of the details of the following discussion. Pages 1–109 contain the software to be loaded on the host computer 10. Pages 110–143 contain the software to be loaded on the control processor 12. Pages 144–176 contain the software to be loaded on the processors 22,24 of a node 14. Throughout the following discussion, each software subdivision will be referred to as a computer software configuration item (CSCI; top level), as a computer software component (CSC; intermediate level), or as a computer software unit (CSU; bottom level). Each CSCI is made up of several CSCs. A CSC may be in turn subdivided into additional CSCs for as many intermediate levels as are present. The lowest CSCs are divided into CSUs, all of which are on the bottom level of the software hierarchy.

The monitor CSC is the software module which allows control of all of the processors 22,24 in the node 14, providing visibility into the machine states and the execution control function such as breakpoint and single stepping. The monitor software 34,36,40,42 is relied upon heavily for the debugging, and otherwise developing, the signal processing algorithms on the node's processors 22,24.

When the master processor 22 (processor number 0) is released from reset, it executes the reset software 44 residing in the ROM 30. The slave processors 24 are held at reset, and will only be released by the master processor 22. The ROM reset software 44 waits for the memory modify monitor software commands (i.e., part of the control monitor software 36) from the control processor 12, each of which allows the master processor 22 to initialize its memory with up to thirty-two full words of the master monitor software 40.

After the master monitor software 40 is completely loaded, the master processor 22 will transition to the master initialization state; that is, the master processor is internally checked, the external memory is also tested, and all of the user memory areas are initialized to '0'. The master monitor software 40 then loads in the slave monitor software 42, again using the memory modify monitor software commands from the control processor 36. When the slave monitor software 42 is completely loaded, the master processor 22 will release each of the slave processors 24 one by one, waiting for the slave processor 24 to go through the ROM reset sequence and jump into the newly loaded slave monitor software 42, and finally acknowledging the completion of the slave initialization routine.

All of the node's processors use a single 8K word ROM 30, preferably a PROM. This PROM 30 occupies the lowest 8K words of the spectrum of the memory 26. Since the interrupt vectors are located in this part of the memory 26, they are shared by all processors 22,24. By the same token, the ROM reset software 44 is also shared by all processors 22,24. Hence, upon reset, the ROM reset software 44 has to first determine the processor number. Since this number is used quite frequently by the monitor software 34,36,40,42, and application software, and it is quite cumbersome to compute this value from the static I/O pin values on the fly, the ROM reset software 44 will store it away in a predetermined internal memory location for later use.

If the processor number is '0', it is the master processor 22 that is being reset. The hardware is designed such that the rest of the processors, i.e., the slave processors 24, are all held at reset, that is, they are not able to proceed with the ROM reset sequence. The master processor 22 first bootstraps the master monitor software 40 by responding to the memory modify commands from the control processor 12. The design philosophy is to put the absolute minimum amount of logic into the ROM 30, so that any changes in the monitor software functionalities will not require any changes in the ROM resident software, only in the RAM resident portion of the monitor software 40. The ROM reset software will also respond to the load complete command by exiting the master monitor software downloading loop. At this time, the program exercises a direct jump to the RAM resident master monitor software 40.

If the processor number is not '0', it is the individual slave processor 24 which is undergoing this ROM reset sequence. At this point, the RAM resident slave monitor software 42 should have already been downloaded by the master monitor software 40. A direct jump to the slave monitor software RAM resident software 42 is therefore adequate.

The master monitor CSC can be divided into the following CSUs:
Master Initialization,
Master Command Loop,
Operation Request Handlers,
Signal Processor Interrupt Handlers,
Breakpoint Exception Handlers,
Application Context Switcher,
Monitor Software Utility Routines.

Figure 2:
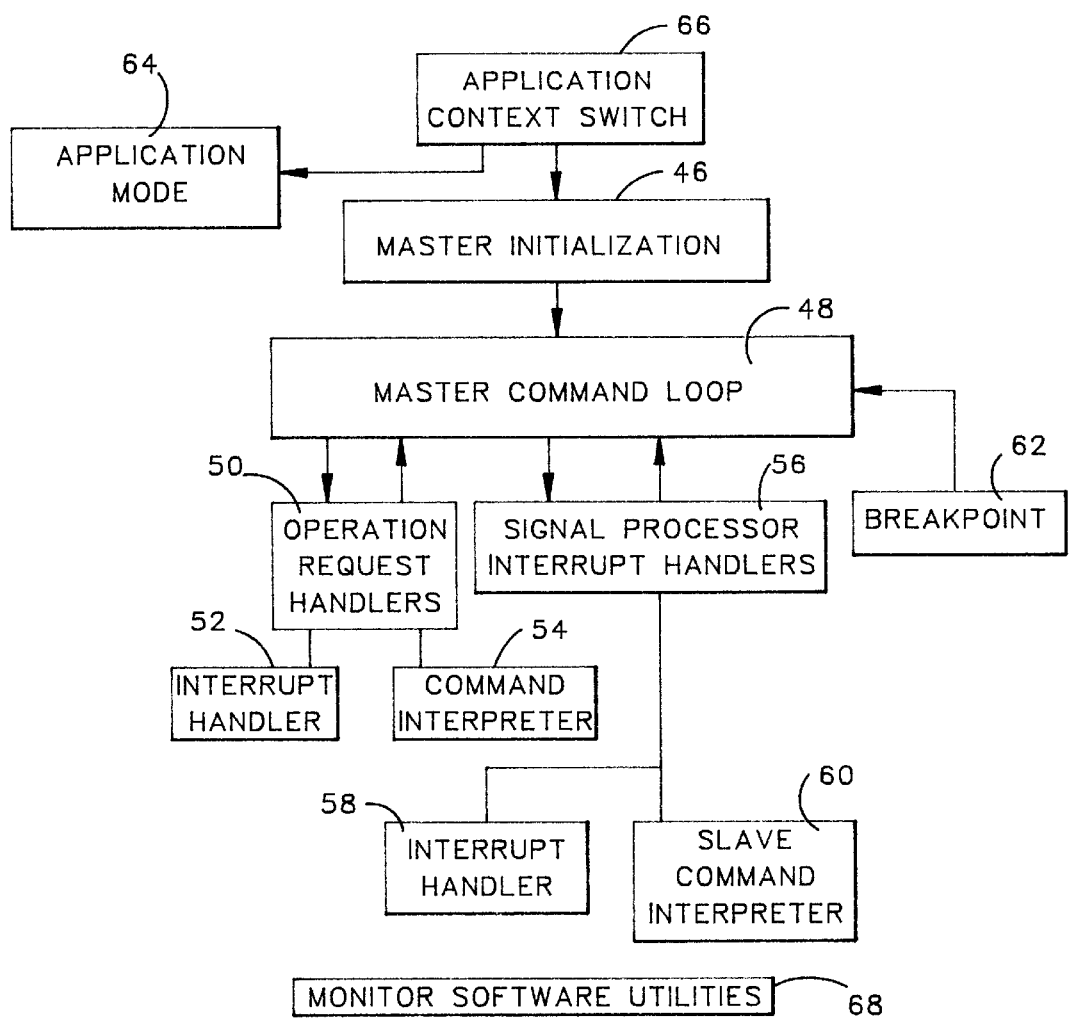
FIG. 2 depicts the relationship among the computer software units of the signal processor master monitor software computer software component.

The relationship among these CSUs is shown in FIG. 2.

Master initialization 46 is the first CSU of the master monitor CSC. It is entered through a direct jump from the ROM reset program, assuming the processor number is '0'. The first function it performs is to test all application memory areas in both the internal processors 22,24 and external global memories 28. This is a destructive memory test, so the areas dedicated to the use of the master monitor software 40, such as the program and data memories, are carefully skipped from the test. Following the memory tests, all tested memory locations are 'zeroed' out.

The monitor software allows for an indirect vectoring for interrupt vector location 1. In the structure of the preferred C30 processor, this corresponds to interrupt INTO. The standard interrupt vector 1 handler will indirectly jump to the desired interrupt handler based on a vector table, which has a separate location for each processor. This feature allows the application to change the interrupt handling routine even when the interrupt vector numbers are permanently loaded in the PROM 30. However, the master monitor software 40 has to initialize this vector table during initialization to the standard INTO handlers, as provided by the monitor software.

The master initialization CSC 46 also includes the downloading of the slave monitor software 42. This is achieved using the same memory modify command mechanism as the master monitor software downloading. After the downloading, the communication mailboxes between the master 22 and slave 24 monitor processors are cleared. The master 22 then releases each one of the slave processors 24 from the reset hold state, allowing the slave 24 to complete the reset sequence. The master 22 waits for each slave 24 to acknowledge the completion of the reset sequence with an interrupt INTO signal.

Upon the completion of the master monitor software initialization 46, the master monitor software 40 directly jumps to the master command loop CSU 48. The master monitor software 40 will be examining the interrupt flag for the arrival of either one of two interrupt signals. The first signal is INTO, which signals the arrival of a signal processor interrupt from the slave processors. The second signal is INT1, which signals the arrival of the operation request command from the control processor. When one of these interrupt signals is detected, the master monitor software calls the corresponding handling routine and then clears the interrupt bit in the interrupt flag register.

The operation request handlers CSU 50 handles the operation requests from the control processor. Some of these requests are originated during run time. Such run time requests are application dependent, and form no part of the present invention. Most of these are resulting from the user actions through the user friendly interface CSCI. This CSU 50 is further broken into two portions: an interrupt handler 52 which handles all operation requests during the application run time, and a command interpreter 54 which handles all operation requests while the processors are in the monitor software command loop 48. This is where most of the visible monitor software functionalities are handled. FIG. 3 shows a list of the operation request types currently being handled by the monitor software.

The operation request handlers CSU 50 has to determine if the host computer 10 is requesting action from the master processor 22 or from one of the slave processors 24. Requests for the master processor 22 will be handled directly by the master monitor software 40, while requests for one of the slave processors 24 will be passed onto the slave processor 24 via a monitor software mailbox mechanism. The command is copied to the slave input mailbox. Then an interrupt INTO is generated to signal the availability of a command message.

In addition to handling requests from the control processor 22, the master monitor software 40 also handles requests from the slave monitor processors 24. Slave requests can be either an asynchronously generated message like the "breakpoint reached" condition, or can be a reply to the host commands such as the "examine memory" or "examine register" commands. These are handled through the signal processor interrupt handlers CSU 56. Again, this CSU 56 operates in two portions. The interrupt handler 58 operates during run time. The slave monitor software command interpreter 60 operates during the monitor software command loop 48. The set of legal slave monitor software commands is shown in FIG. 3.

The breakpoint exception handler CSU 62 is used to handle application exception traps to the monitor software. In the preferred embodiment, breakpoint exceptions are the only traps being handled, but specific applications may require the use of additional traps. This CSU 62 allows the application programmers to set static breakpoints in the application software, whereby all processors 22,24 in the entire system will exit the run time mode and will enter the respective monitor software loops.

The processor register context may be switched between application 64 and the monitor software 46 modes by the appropriate one of two routines from the application context switch CSU 66. The first routine, savereg( ), is usually called at the beginning of all interrupt handlers to save the application registers in a register save area in the processor internal memory. The second routine, loadreg( ), is used at the end of the interrupt handler routines to re-enter the application software. It is also the mechanism used by the monitor software to either start any application program, from the beginning, or to restart the application software after each breakpoint.

The monitor software utility routines CSU 68 is a collection of all the monitor software utility routines, which are used by many of the other CSUs. Examples of some of these are:
send_intO_cpu( ), for sending an interrupt 0 to a specific processor
unhold_cpu( ), for releasing a specific processor from
halt_all_cpu( ), for halting all processors in the system
exgo_all_cpu( ), for starting execution of all processors
delay( ), for delaying the program execution by a specified amount of time The signal processor slave monitor CSC 42 resides on every slave processor, and can be divided into the following CSUs:

Slave Initialization

Slave Command Loop,

Signal Processor Interrupt Handlers,

Breakpoint Exception Handlers,

Application Context Switcher,

Monitor Software Utility Routines.

Figure 4:
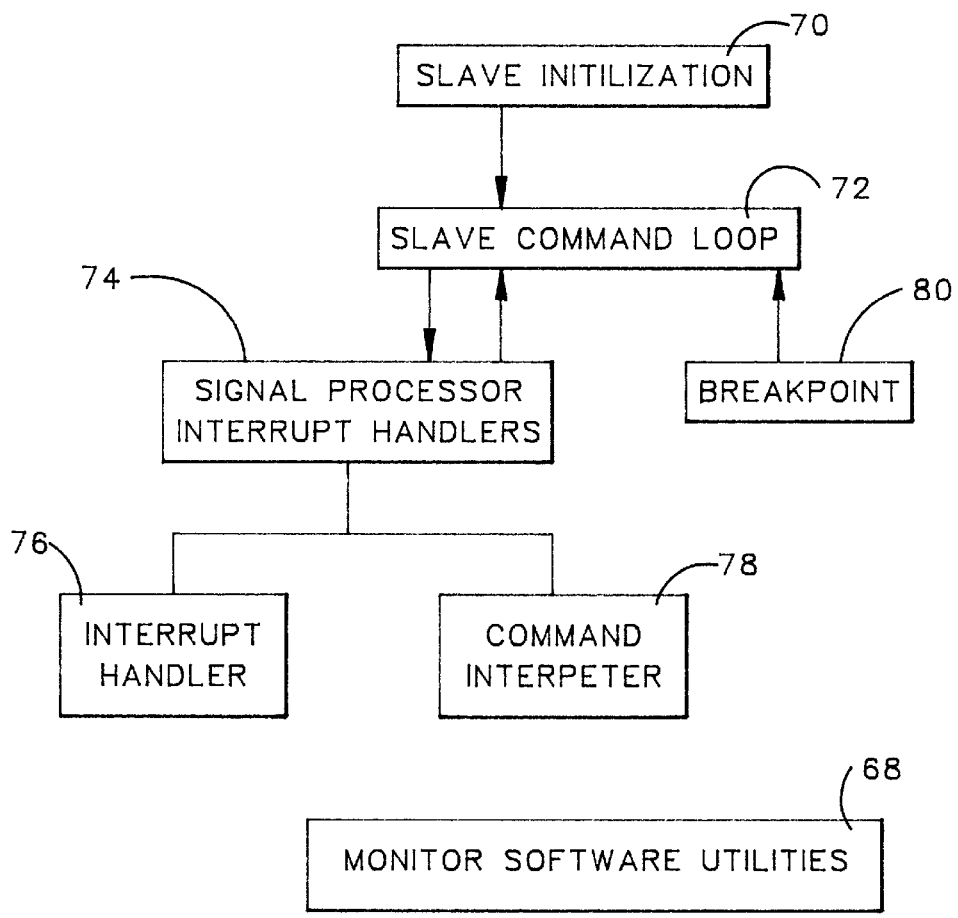
FIG. 4 depicts the relationship among the computer software units of the signal processor slave monitor software computer software component.

FIG. 4 depicts the relationship among these CSUs.

The slave monitor CSC is entered through a direct jump from the ROM reset program. The first slave initialization 70 function it performs is to test all application memory areas in the internal processor memory. This is the same memory test program used by the master monitor software 40. Again, following the memory tests, the memory locations are 'zeroed' out. Finally, the slave monitor software 42 sends an interrupt INTO to the master processor 22 to signal the end of this particular slave processor's initialization.

Upon the completion of the slave monitor software initialization 70, the slave monitor software 42 directly jumps to the slave monitor software command loop CSC 72. The slave monitor software 42 will be examining the interrupt flag for the arrival of the signal processor interrupt signal INTO, which implies that a master monitor software command is pending in the mailbox. When this signal arrives, the slave monitor software 42 calls the corresponding handling routine 74 and clears the interrupt bit in the interrupt flag register.

The monitor software commands are handled by the slave monitor software through the signal processor interrupt handlers CSU 74. As with the master monitor software, there are two portions of this CSU 74: the interrupt handler 76 for application software run time, and the master monitor software command interpreter 78 for operations during the monitor software command loop. The set of legal monitor software commands is also shown in FIG. 3.

The breakpoint exception handler CSU 80 for the slave monitor software first saves the register contents of the application program. It then sends a GORPY (execution go command reply) command to the master monitor software 40 to stop execution on the other processors 22,24. Finally, it jumps to the slave monitor software command loop 72.

The application context switcher CSU 66 and the monitor software utility routines CSU 68 are the same as those used by the master monitor CSC 40, as described above.

Industrial Applicability

The present invention is capable of exploitation in industry, and may be used, whenever it is desired to develop application software for use on multiple processors. The hardware embodiment of the present invention may be made of components which, taken apart from one another, may be entirely conventional, or they may be made from their non-conventional counterparts.

While particular preferred embodiments of the present invention have been described in detail, the true spirit and scope of the present invention is not limited to these particular embodiments, but is limited only by the appended claims.

What is claimed is:

1. A method for multiple software development, comprising:

(a) a host computer directly monitoring at least one master processor;

(b) the host computer indirectly monitoring a slave processor, for each master processor, through a slave transmit/receive buffer in a memory shared by the master processor and the slave processor; and (c) using a tangible memory medium embodying the computer program shown in the appendix.

2. The method of claim 1, further comprising the step of determining, in the master processor, whether a monitoring act is a direct monitoring act intended for the master processor or an indirect monitoring act intended for the slave processor.

3. The method of claim 2, wherein a plurality of slave processors are indirectly monitored and wherein the monitoring act is intended for one of such slave processors, further comprising the step of determining, in the master processor, for which of such plurality of slave processors the monitoring act is intended.

4. The method of claim 1, wherein a plurality of master processors are directly monitored, further comprising the step of determining, for each master processor, whether or not a monitoring act is a direct monitoring act intended for the master processor or an indirect monitoring act intended for a slave processor indirectly monitored through it.

* * * * *